US012601865B2

(12) United States Patent
Johnson

(10) Patent No.: US 12,601,865 B2
(45) Date of Patent: Apr. 14, 2026

(54) SPLIT NVIS FILTER DESIGN

(71) Applicant: Rockwell Collins, Inc., Cedar Rapids, IA (US)

(72) Inventor: Ricky J. Johnson, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 346 days.

(21) Appl. No.: 18/218,820

(22) Filed: Jul. 6, 2023

(65) Prior Publication Data

US 2025/0012958 A1 Jan. 9, 2025

(51) Int. Cl.
G02B 5/28 (2006.01)
G02B 5/22 (2006.01)

(52) U.S. Cl.
CPC ............. G02B 5/282 (2013.01); G02B 5/223 (2013.01); G02B 5/285 (2013.01)

(58) Field of Classification Search
CPC ......... G02B 5/282; G02B 5/223; G02B 5/285
See application file for complete search history.

(56) References Cited

U.S. PATENT DOCUMENTS

| | | | |
|---|---|---|---|
| 6,336,728 B1 | 1/2002 | Deloy | |
| 6,419,372 B1 | 7/2002 | Shaw et al. | |
| 6,574,030 B1 * | 6/2003 | Mosier | G02B 27/0101 349/97 |
| 6,639,349 B1 | 10/2003 | Bahadur | |

| | | | |
|---|---|---|---|
| 6,714,186 B1 | 3/2004 | Mosier et al. | |
| 6,842,204 B1 * | 1/2005 | Johnson | G02F 1/133615 349/61 |
| 7,025,474 B2 | 4/2006 | Campbell et al. | |
| 7,036,946 B1 | 5/2006 | Mosier | |
| 7,081,991 B2 * | 7/2006 | Jones | G02B 5/223 359/359 |
| 7,481,954 B2 | 1/2009 | Warren, Jr. et al. | |
| 7,924,371 B1 | 4/2011 | Davis | |
| 8,089,579 B1 | 1/2012 | Johnson et al. | |
| 8,641,219 B1 | 2/2014 | Johnson et al. | |
| 8,681,290 B1 | 3/2014 | Hufnagel et al. | |
| 8,956,034 B1 | 2/2015 | Johnson | |
| 9,836,089 B1 | 12/2017 | Covington et al. | |
| 10,191,199 B2 | 1/2019 | Nichol et al. | |
| 10,239,634 B2 | 3/2019 | Johnson | |
| 10,274,661 B1 | 4/2019 | Johnson et al. | |
| 10,573,217 B2 | 2/2020 | Johnson | |
| 10,598,848 B2 | 3/2020 | Coleman et al. | |
| 10,775,662 B2 | 9/2020 | Johnson | |
| 10,935,716 B2 | 3/2021 | Nichol et al. | |

(Continued)

OTHER PUBLICATIONS

European Search Report received in EP Application No. 24187231, Nov. 28, 2024, 8 pages.

(Continued)

*Primary Examiner* — Nathanael R Briggs
(74) *Attorney, Agent, or Firm* — Suiter Swantz IP

(57) ABSTRACT

A display includes a split night visions imaging system (NVIS) filter, including a first and second interference filter. The first interference filter is disposed between a backlight and a diffuser of the display. The second interference filter is disposed between the diffuser and an LCD stack of the display. A cutoff wavelength of the second interference filter is between cutoff wavelengths of the first interference filter.

15 Claims, 6 Drawing Sheets

200

(56)              References Cited

U.S. PATENT DOCUMENTS

| | | | |
|---|---|---|---|
| 10,996,511 | B1 | 5/2021 | Walker et al. |
| 11,102,860 | B2 | 8/2021 | Johnson |
| 11,256,025 | B2 | 2/2022 | Nichol et al. |
| 2004/0181006 | A1 | 9/2004 | Warren, Jr. et al. |
| 2014/0036533 | A1 | 2/2014 | Smith-Gillespie |
| 2016/0328065 | A1 | 11/2016 | Johnson et al. |
| 2021/0302780 | A1 | 9/2021 | Johnson et al. |
| 2022/0179148 | A1 | 6/2022 | Coleman et al. |
| 2022/0398987 | A1 | 12/2022 | Wyatt |
| 2023/0011530 | A1 | 1/2023 | Nichol et al. |

OTHER PUBLICATIONS

MIL-STD 3009; Department of Defense Interface Standard, Lighting, Aircraft, Night Vision Imaging System (NVIS) Compatible, Feb. 2, 2001.

* cited by examiner

| | u' | v' | Luminance | NRa | NRb |
|---|---|---|---|---|---|
| White | 0.1794 | 0.4782 | 1.62E+01 | 1.20E-08 | 1.20E-09 |
| Red | 0.4204 | 0.516 | 3.19E+00 | 5.82E-08 | 5.67E-09 |
| Green | 0.1069 | 0.5731 | 1.18E+01 | 4.52E-10 | 9.84E-11 |
| Blue | 0.1811 | 0.1678 | 1.25E+00 | 4.17E-09 | 1.38E-09 |
| Black | 0.1823 | 0.4283 | 1.49E-02 | 6.51E-11 | 5.05E-11 |

SPLIT NVIS FILTER DESIGN

TECHNICAL FIELD

The present invention generally relates to the field of displays, and more specifically to displays with infrared filtering.

BACKGROUND

Certain aviation displays are color displays that are utilized with night vision imaging systems (NVIS). These displays provide visual information to captains, pilots, and drivers of ships, aircraft, and vehicles. The user of the color display often wears NVIS goggles at the same time he or she observes information from the color display.

NVIS goggles are sensitive to light in the infrared, near infrared, and visible red spectrum (wavelengths of light). NVIS goggles are typically sensitive to light between 600 nm and 950 nm wavelengths. Although the NVIS goggles allow the pilot or person wearing the goggles to see objects which cannot ordinarily be seen by the naked eye, the goggles emit bright light (e.g., bloom effect) to the pilot's eyes if the goggles are exposed to broadband emissions. Accordingly, if avionic displays emit infrared, near infrared and sometimes even visible red light, the pilot's vision through the goggles is impaired when using the goggles.

Conventional avionic systems have included color displays that include an NVIS filter. The NVIS filter is provided between a light source and an optical shutter, such as a liquid crystal display. The filter prevents emissions that cause NVIS equipment to bloom. The NVIS filters are high performance in the infrared wavelengths. However, the NVIS filters are complex to manufacture. The NVIS filters typically have more than 80 coating layers. The complexity of the NVIS filters cause the NVIS filters to be expensive and contribute to much of the cost of the avionic displays. Therefore, it would be advantageous to provide a device, system, and method that cures the shortcomings described above.

SUMMARY

A display is disclosed, in accordance with one or more embodiments of the present disclosure. The display includes a backlight comprising one or more light emitting diodes (LEDs) configured to generate light. The display includes a first interference filter. The first interference filter comprises a first cutoff wavelength and a second cutoff wavelength. The second cutoff wavelength of the first interference filter is greater than the first cutoff wavelength of the first interference filter. The display includes a diffuser. The first interference filter is between the backlight and the diffuser. The display includes a second interference filter. The second interference filter comprises a first cutoff wavelength. The first cutoff wavelength of the second interference filter is between the first cutoff wavelength of the first interference filter and the second cutoff wavelength of the first interference filter. The display includes an LCD stack. The second interference filter is between the diffuser and the LCD stack. In some embodiments the display is a flight display.

A cockpit is disclosed, in accordance with one or more embodiments of the present disclosure. The cockpit includes a plurality of flight displays.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6 depicts a table of u' and v' characteristics of a display, in accordance with one or more embodiments of the present disclosure.

DETAILED DESCRIPTION OF THE INVENTION

Figure 1:
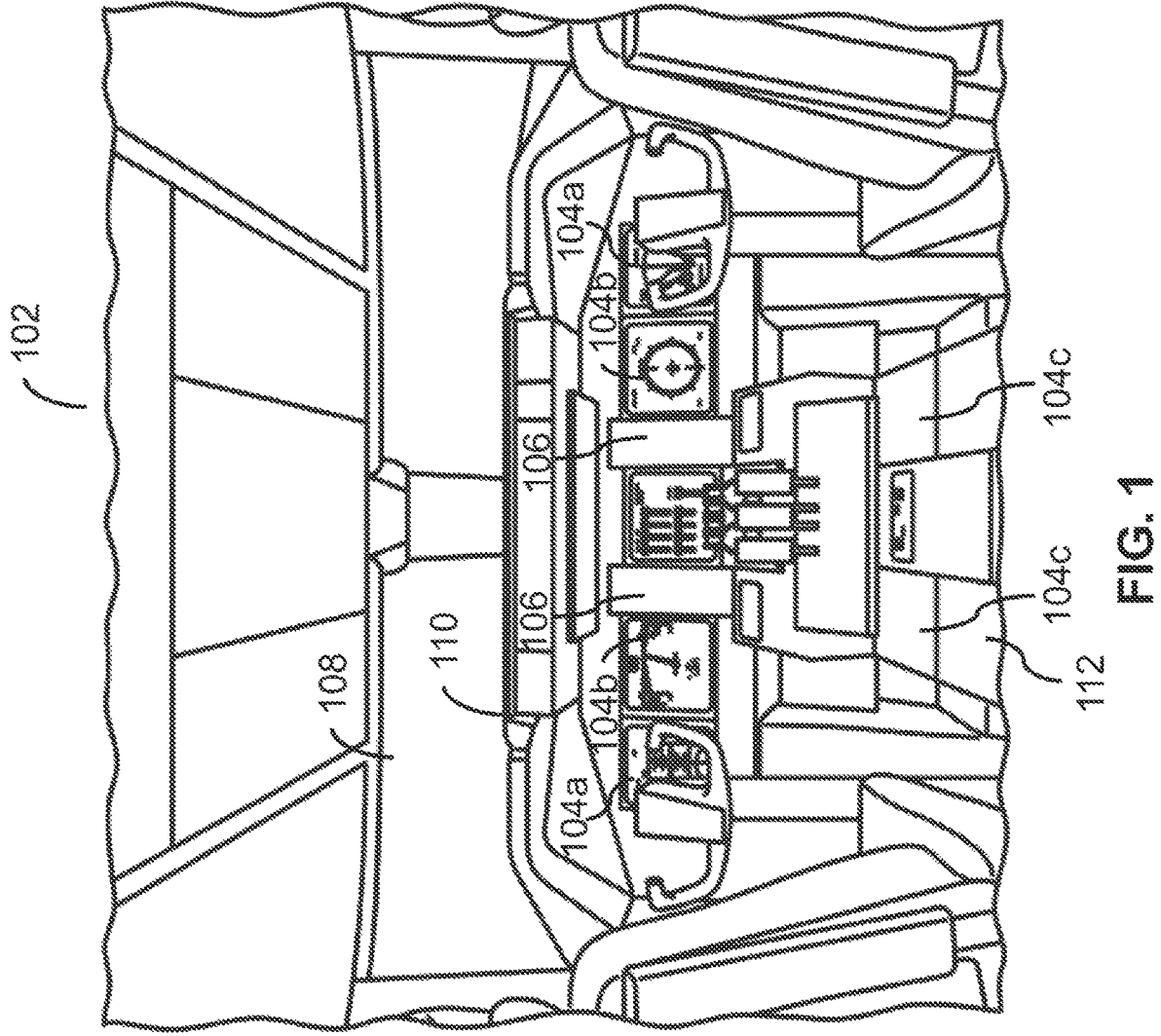
FIG. 1 depicts a cockpit of an aircraft including flight displays, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a split night vision infrared system (NVIS) filter design. The NVIS filter design provides an NVIS compliant display. A thin film filter is split into two interference filters. The first interference may be referred to as a notch filter and a longer wavelength blocking filter. The notch filter is placed between the diffuser and backlight. The longer wavelength blocking filter is placed between the diffuser and LCD stack. This split configuration simplifies the NVIS filter design and gives superior black NVIS performance when compared to a standard thin film filter that is placed between the diffuser and backlight.

U.S. Pat. No. 6,714,186, titled "Avionic display with tunable filter"; U.S. Pat. No. 7,081,991, titled "Dye-based filter"; U.S. Pat. No. 8,956,034, titled "System and method for providing a tailored angular distribution of light from a display"; U.S. Pat. No. 8,641,219, titled "High efficiency rear lit waveguide"; U.S. Patent Publication No. 2016/0328065, titled "Touchscreen with Dynamic Control of Activation Force"; U.S. Pat. No. 9,836,089, titled "Resizing of emissive displays for avionics applications"; U.S. Pat. No. 10,239,634, titled "OLED lighting for avionic keypanels"; U.S. Pat. No. 10,274,661, titled "Compact waveguide backlight system and method"; U.S. Pat. No. 10,573,217, titled "Pixel design and method to create formats which extends OLED life"; U.S. Pat. No. 11,102,860, titled "Backlit display dimming system and method"; U.S. Pat. No. 10,996,511, titled "Curved backlight and system for stray light control"; U.S. Patent Publication No. 2021/0302780, titled "System and method to heat lcds using UV LEDs"; U.S. Pat. No. 6,419,372, titled "Compact optical wave-guide system for LED backlighting liquid crystal displays"; U.S. Pat. No. 6,574,030, titled "Multi-mode display using an electronically controlled mirror"; U.S. Pat. No. 6,842,204, titled "Color display system for NVIS Class A compatibility"; U.S. Pat. No. 7,481,954, titled "Composition for a light filtering material"; U.S. Pat. No. 8,681,290, titled "System for improvement of light insertion into a light guide from light-emitting diodes (LEDs)"; U.S. Pat. No. 10,775,662, titled "Thin LCD direct-lit backlight with low cost heater"; U.S. Pat. No. 7,025,474, titled "Dual mode display with a backlight filter for an unactivated light emitting diode (LED)"; are each incorporated by reference in the entirety.

Referring to FIG. 1, a cockpit 102 of an aircraft 100 is shown, according to some embodiments. The cockpit 102 may also be referred to as a control center or a flight deck. The cockpit 102 may include one or more flight displays 104, one or more user interface ("UI") elements 106, and the like.

The flight displays 104 may be implemented using any of a variety of display technologies, including CRT, LCD, organic LED, dot matrix display, and others. Touchscreens may be implemented on the flight displays 104. Any single or multi-touch technology will support the concepts described herein. It is further contemplated that one or more of the flight displays 104 may not include touchscreen functionality. In this regard, the flight display 104 may include a touchscreen or a non-touch display (i.e., without touchscreen functionality). The flight displays 104 may also be referred to as display units (DUs).

The flight displays 104 may be head-down displays (HDD). HDD may be located on a main instrument panel of the cockpit 102 in front of the pilot and below a windscreen 108 and/or glareshield 110. The flight displays 104 may be used to display various images. The images may provide information to the pilot (e.g., captain, first officer), thereby increasing the pilot's visual range and enhancing their decision-making abilities. The images on the flight displays 104 may be provided in a standard or certified format.

The flight displays 104 may be primary flight displays (PFD 104a), multi-function displays (MFD 104b), auxiliary flight displays (AFD 104c), and so on. Other types and functions of the flight displays 104 are contemplated and will be apparent to those skilled in the art. For instance, the flight displays 104 may also be configured to function as, for example, an engine indicating and crew-alerting system ("EICAS") display. The EICAS display may be used to display critical engine and system status data.

The flight displays 104 may be configured to function as, for example, a primary flight display (PFD 104a). The PFDs 104a may be used to display primary flight information, such as, but not limited to, altitude, airspeed, vertical speed, and navigation and traffic collision avoidance system ("TCAS") advisories. The PFDs 104a may be located directly in front of the pilot (e.g., captain, first officer) and may provide primary flight information, such as, altitude, airspeed, and heading.

The flight displays 104 may also be configured to function as, for example, a multi-function display (MFD 104b). The MFDs 104b may be used to display the primary flight information and/or various other information such as, but not limited to, navigation maps, weather radar, electronic charts, TCAS traffic, aircraft maintenance data and electronic checklists, manuals, procedures, system information, and the like. The MFDs 104b may be located to one side or another of the PFD 104a. The MFDs 104b may also be referred to as navigation ("NAV") displays.

The flight displays 104 may also be configured to function as, for example, an auxiliary flight display (AFD 104c). The cockpit 102 is shown to include a central pedestal 112. One or more of the AFDs 104c may be disposed in the central pedestal 112 of the cockpit 102. The AFDs 104c may include a touchscreen display and/or a hard keyboard display. The AFDs 104c may also be referred to as control display units (CDUs).

In some embodiments, the flight displays 104 may provide an output from an aircraft-based system, a ground-based system, a satellite-based system, or from a system of another aircraft. For example, in one embodiment, the flight displays 104 provide an output from a ground-based weather radar system. In some embodiments, the flight displays 104 provide an output from an aircraft-based weather radar system, LIDAR system, infrared system or other system on the aircraft. For example, the flight displays 104 may include an avionics display, a joint display, an air traffic display, a weather radar map, and a terrain display. The flight displays 104 may include an electronic display or a synthetic vision system ("SVS"). For example, the flight displays 104 may include a display configured to display a two-dimensional ("2-D") image, a three-dimensional ("3-D") perspective image of air traffic data, terrain, and/or weather information, or a four-dimensional ("4-D") display of weather information or forecast information. Other views of air traffic information, terrain, and/or weather information may also be provided (e.g., plan view, horizontal view, and vertical view). The views shown on the flight displays 104 may include monochrome or color graphical representations of the displayed information. Graphical representations of the displayed information may include an indication of altitude of other aircraft, weather conditions, or terrain, or the altitude and/or location of such information relative to the aircraft.

The UI elements 106 are now described. The UI elements 106 may include, for example, dials, switches, buttons, touch screens, keyboards, a mouse, joysticks, cursor control devices ("CCDs") or other multi-function key pads certified for use with avionics systems, and so on. The UI elements 106 may be configured to, for example, allow a pilot to interact with various avionics applications and perform functions such as data entry, manipulation of navigational maps, and moving among and selecting checklist items. For example, the UI elements 106 may be used to adjust features of the flight displays 104, such as contrast, brightness, width, and length. The UI elements 106 may also (or alternatively) be used by the pilot to interface with or manipulate the displays of the flight displays 104. The UI elements 106 may additionally be used to acknowledge or dismiss an indicator provided by the flight displays 104. In embodiments, the UI elements 106 may configure a mode of the flight displays 104 (e.g., between a primary mode and a NVIS mode).

Light with near-infrared wavelengths interferes with the night vision goggles of a NVIS. For example, the light with near-infrared wavelengths which is emitted into free-space in the cockpit 102 reflects from various surfaces within the cockpit 102 before impinging on the night vision goggles. It is therefore desirable to prevent the flight displays 104 from emitting light with the near-infrared wavelengths. In embodiments, the flight displays 104 include a split NVIS filter design to filter the light with the near-infrared wavelengths.

Figure 2:
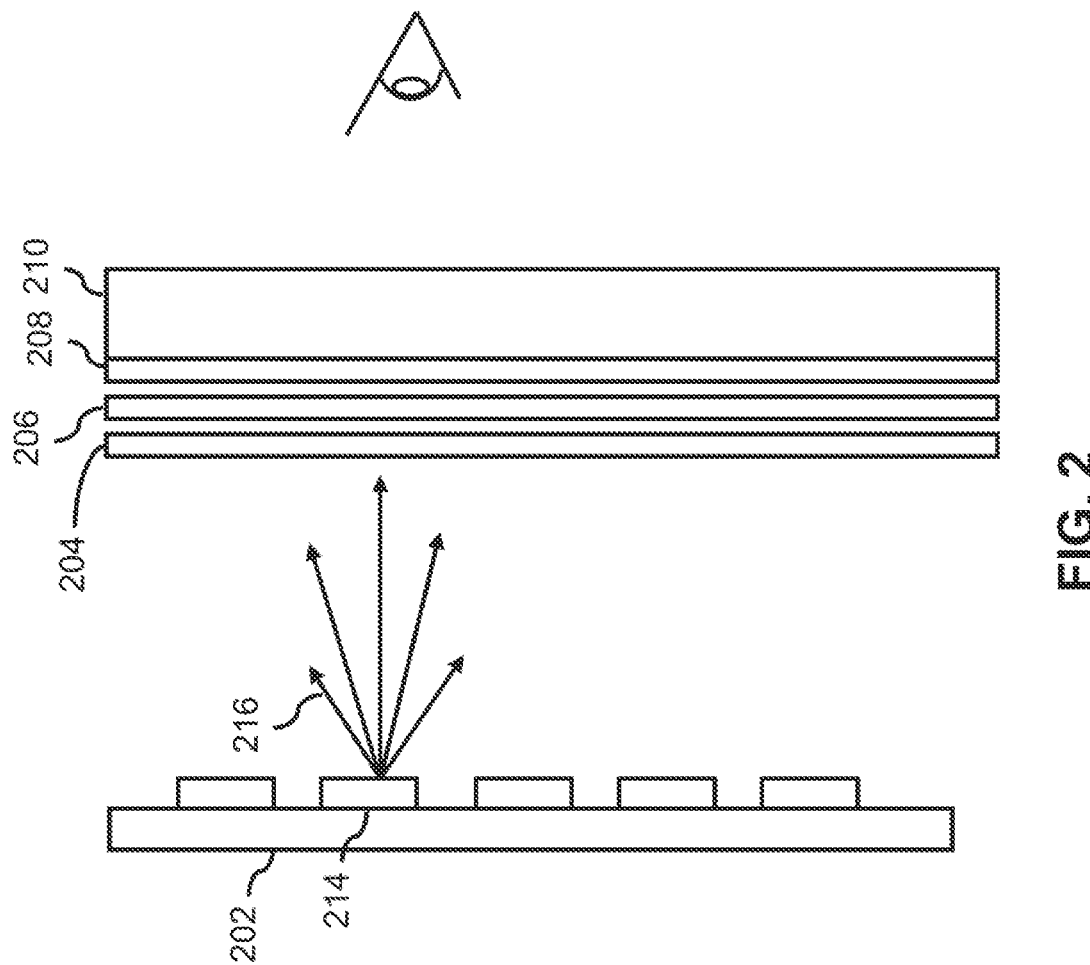
FIG. 2 depicts a side view of a display including a split NVIS filter design, in accordance with one or more embodiments of the present disclosure.

Referring now to FIG. 2, a display 200 is described in accordance with one or more embodiments of the present disclosure. The embodiments and the enabling technology described previously herein in the context of the flight display 104 should be interpreted to extend to the display 200. It is further contemplated that the display 200 is not limited to the flight display 104. For example, the display 200 may be utilized in several applications where filtering light with near-infrared wavelengths.

The display 200 includes one or more components, such as, but not limited to, a backlight 202, an first interference filter 204, a diffuser 206, a second interference filter 208, and an LCD stack 210. The first interference filter 204 and the second interference filter 208 are split around the diffuser 206. The position of the first interference filter 204 and the second interference filter 208 provides several benefits, as will be described further herein.

The backlight 202 includes a light source configured to generate light 216. For example, the backlight 202 includes one or more light emitting diodes (LEDs) 214, or the like. The one or more LEDs 214 are configured to generate the light 216. In some embodiments, the backlight 202 includes an LED array. The LED array may include one or more of the LEDs 214.

The diffuser 206 receives light 216 and scatters the light 216 to reduce features of the light source (i.e., LEDs 214) and provide a uniform light. The diffuser 206 is spaced at a position away from the backlight 202. The hiding power of the diffuser 206 is dependent on the characteristics of the diffuser 206 and the position of the diffuser 206 relative to the backlight 202. Therefore, it is desirable to space the diffuser 206 away from the backlight 202 to cause the LEDs 214 of the backlight 202 to appear uniform, rather than as individual spot sources. For example, the diffuser 206 may be between 0.25 and 0.5 inches away from the backlight 202, or more.

The display 200 also includes the LCD stack 210. The LCD stack 210 may include a passive-matrix LCD (PMLCD), an active-matrix LCD (AMLCD), and the like. The LCD stack 210 may include one or more layers (not depicted). For example, the one or more layers of the LCD stack 210 may include two polarizer films, a glass substrate, a liquid crystal layer, a reflective layer, and the like. The liquid crystal layer includes regions which are transparent or opaque based on an appropriate voltage being applied to the regions to generate a matrix of pixels. The liquid crystal layer may also include color filters to generate colored subpixels (e.g., red, green, blue (RGB) subpixels or the like). In some embodiments, the one or more layers of the LCD stack 210 includes a touchscreen sensor, or the like. In this regard, the display 200 may be a touchscreen display. The LCD stack 210 is a transmissive technology and does not emit light. Rather, the LCD stack 210 is illuminated by light 216 from the backlight 202. Rather, the LCD stack 210 is illuminated by the light 216 from the backlight 202.

Undesirably, a portion of the light 216 generated by the backlight 202 has a wavelength which interferes with an NVIS. For example, a portion of the light 216 may include near-infrared wavelengths. The display 200 includes the first interference filter 204 and the first interference filter 204 to reduce the light with the near-infrared wavelength.

The first interference filter 204 and the second interference filter 208 are each interference filters. The interference filters may also be referred to as thin-film optical filter, hot mirrors, dielectric mirrors, Bragg mirrors, and/or notch filters. The interference filters include multiple coatings of thin films with different index of refractions. The coatings provide constructive and destructive interference. The coatings then reflect light with certain wavelengths and transmit light with certain wavelengths. The reflection and transmission may be based on a thickness of the coating. Each of the first interference filter 204 and the second interference filter 208 is about 30 layers, as opposed to legacy NVIS filter which were about 80 layers. The split NVIS design then has about a 40% lower material cost with similar or even improved performance.

The interference filters provide very steep roll-off or cutoff wavelength at selected wavelengths. For example, the interference filters have high transmission in the blue and green wavelengths and low or no transmission of infrared and near-infrared wavelengths. The interference filters reflect the light 216 with the infrared and near-infrared wavelengths. The interference filters are designed to reflect as much light with the infrared and near-infrared wavelengths as possible. A portion of the light 216 with the infrared and near-infrared wavelengths may transmit through the interference filters, although this is not desired. In some embodiments, the interference filters may reflect up to 99 percent of the light 216 with the infrared and near-infrared wavelengths.

The first interference filter 204 is now described. The first interference filter 204 is positioned to receive light from the backlight 202. The first interference filter 204 is a notch filter having attenuation characteristics particular to a wavelength range. The first interference filter 204 is disposed between the backlight 202 and the diffuser 206. The position of the first interference filter 204 is also referred to as being behind the diffuser 206. The first interference filter 204 permits light with wavelengths outside the notch to transmit through the interference filter towards the diffuser 206 and reflect light within the notch towards the backlight 202.

The first interference filter 204 may be located at any position between the backlight 202 and the diffuser 206. In embodiments, the display 200 may include a free space between the backlight 202 and the first interference filter 204 and/or may include a free space between the first interference filter 204 and the diffuser 206, although this is not intended as a limitation of the present disclosure. It is further contemplated that the first interference filter 204 may be directly coupled to the backlight 202 and/or the diffuser 206.

The second interference filter 208 is now described. The second interference filter 208 is positioned to receive light from the diffuser 206. The second interference filter 208 has attenuation characteristics particular to a wavelength range. The second interference filter 208 is disposed between the diffuser 206 and the LCD stack 210. The position of the second interference filter 208 is also referred to as being in front of the diffuser 206. The second interference filter 208 permits light with select wavelengths to transmit through the second interference filter 208 towards the LCD stack 210 and reflect light without the select wavelength towards the backlight 202.

The second interference filter 208 may be located at any position between the diffuser 206 and the LCD stack 210. In embodiments, the display 200 may include a free space between the diffuser 206 and the second interference filter 208 and/or a free space between the second interference filter 208 and the LCD stack 210, although this is not intended to be limiting. It is further contemplated that the second interference filter 208 may be directly coupled to the diffuser 206 and/or the LCD stack 210.

The one or more LEDs 214 may generate the light 216 in one or more directions. The directions of the light 216 may be referred to as on-axis or off-axis. On-axis light refers to light which is normal to the first interference filter 204, diffuser 206, second interference filter 208, and/or LCD stack 210. Similarly, off-axis light refers to light which is not normal to the first interference filter 204, diffuser 206, second interference filter 208, and/or LCD stack 210.

The various transmission curves and transmission characteristics described herein are described in the context of on-axis light. For example, measurements of transmission curves are made on-axis as the light 216 goes straight through the various components of the display 200.

Light that goes off-axis through the first interference filter 204 and the second interference filter 208 causes the transmission characteristics of the various components to shift in wavelength. As the light 216 goes off-axis, the interference filters tend to downshift the cutoff wavelength. The interference filter than cuts off more red light, causing the display 200 to appear blue. In this regard, light that transmits at 45 degrees through the first interference filter 204 and/or the second interference filter 208 appears with a different color than light that goes on-axis. The light 216 goes through the first interference filter 204 off-axis hits the diffuser 206. A portion of the off-axis light that hits the diffuser 206 may be shifted on-axis by the diffuser 206. The light 216 that hits the diffuser 206 scatters forward towards the second interference filter 208. The diffuser 206 shifts a portion of the on-axis and off-axis light. In this regard, a portion of the on-axis light may be shifted off-axis and a portion of the off-axis light may be shifted on-axis. In this regard, the shifted on-axis light is scattered back to normal. The diffuser 206 thus performs integration of light over angles (e.g., integrating the on-axis and off-axis light). The integration may be advantageous to cause the display 200 to appear a similar color when viewed on-axis and off-axis.

In some embodiments, a pilot may view several of the displays 200 off-axis. For example, the pilot may look at a weather display which is located twenty to thirty degrees off-axis between the captain and the first-officer. By way of another example, the captain may look at a display in front of a first-officer which is off-axis to the captain.

Figure 3:
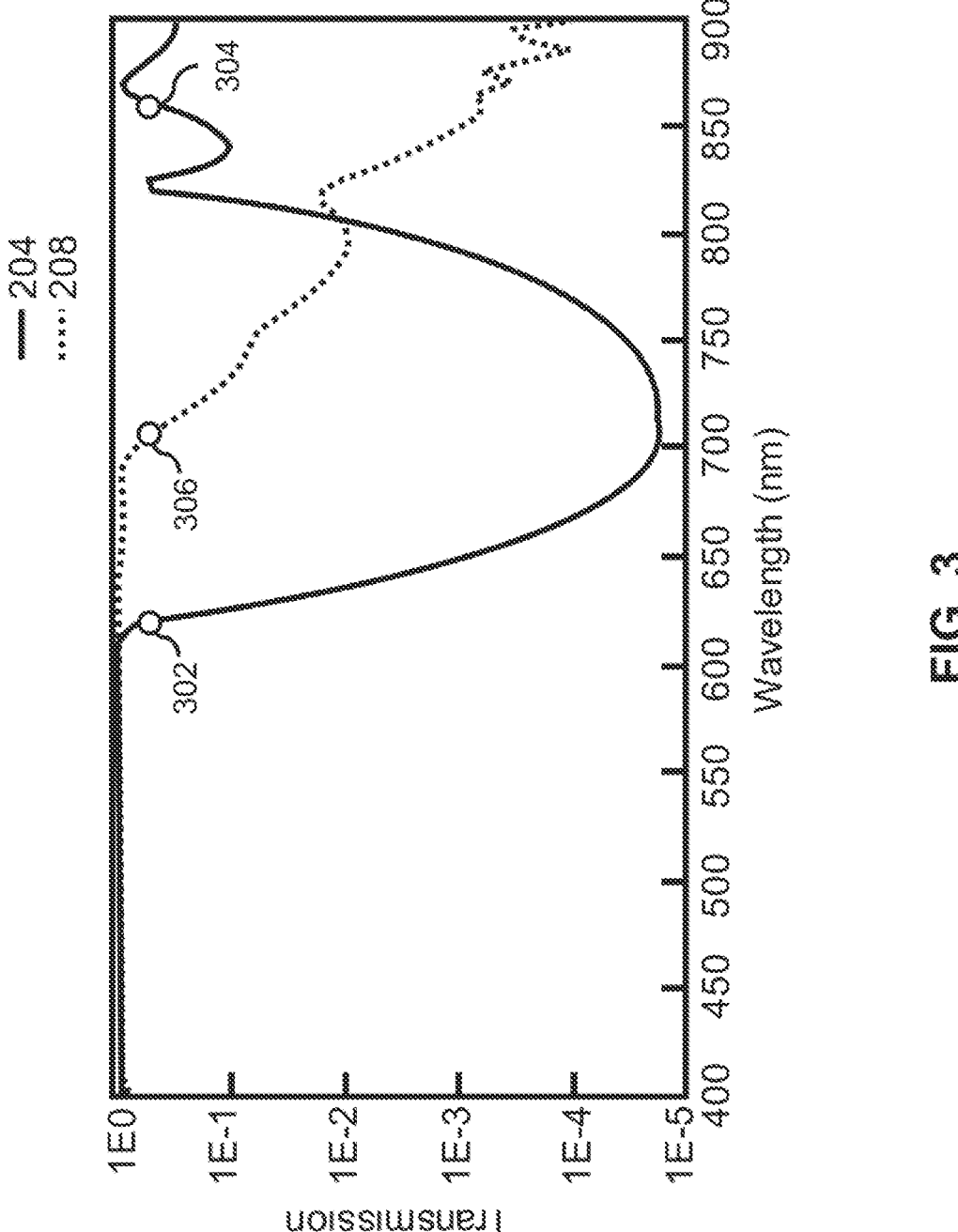
FIG. 3 depicts a graph of transmission curves of split NVIS filters, in accordance with one or more embodiments of the present disclosure.

Referring now to FIG. 3, a graph 300 is described, in accordance with one or more embodiments of the present disclosure. The graph 300 depicts transmission curves of the first interference filter 204 and the second interference filter 208 as a function of wavelength in nanometers. The y-axis of the graph 300 is in a log scale.

The term cutoff wavelength denotes wavelengths at which transmission of light through the filters is at 50% (i.e., 0.5E0). The first interference filter 204 and the second interference filter 208 include cutoff wavelengths to filter light with select wavelengths.

As depicted, the first interference filter 204 is a notch filter. The transmission curve characteristics of the first interference filter 204 are selected based on a desired performance of the display 200. Wider notches cause the number of layers in the first interference filter 204 to increase. It is desirable to have a sufficient notch to overlap with the second interference filter 208 but not too large of a notch to unnecessarily increase the complexity of the first interference filter 204.

The first interference filter 204 includes a first cutoff wavelength 302 and a second cutoff wavelength 304. The second cutoff wavelength 304 is greater than the first cutoff wavelength 302. The first interference filter 204 transmits less than 50% of light between the first cutoff wavelength 302 and the second cutoff wavelength 304.

In some embodiments, the first interference filter 204 includes the first cutoff wavelength 302 between 600 and 650 nanometers. In some embodiments, the first interference filter 204 includes the first cutoff wavelength 302 at 640+−7 nanometers. As depicted, the first cutoff wavelength 302 of the first interference filter 204 is around 625 nanometers, although this is not intended to be limiting. In some embodiments, the first cutoff wavelength 304 of the first interference filter 204 is selected so that the first interference filter 204 does not transmit light with red wavelengths (e.g., 620 nm to 750 nm). In some embodiments, the second cutoff wavelength 304 of the first interference filter 204 is between 750 and 800 nanometers. As depicted, the second cutoff wavelength 304 of the first interference filter 204 is around 850 nanometers, although this is not intended to be limiting.

In some embodiments, the first interference filter 204 has at least 98% transmission from 400 nm to 650 nm. In some embodiments, the first interference filter 204 has at most 5% transmission from 650 nm to 750 nm. In some embodiments, the first interference filter 204 has four-order of magnitude blocking at 700 to 750 nanometers.

The transmission of the second interference filter 208 is now described. The second interference filter 208 includes a first cutoff wavelength 306. Notably, the first cutoff wavelength 306 of the second interference filter 208 is greater than the first cutoff wavelength 302 of the first interference filter 204. In this regard, the second interference filter 208 may be referred to as a longer wavelength blocking filter. The first cutoff wavelength 306 of the second interference filter 208 at the longer wavelength enables the second interference filter 208 to include a simpler design than the first interference filter 204. In some embodiments, the first cutoff wavelength 306 of the second interference filter 208 is selected so that the second interference filter 208 transmits light with red wavelengths (e.g., 620 nm to 750 nm). The display 200 may then display red colors on the display 200. In some embodiments, the first cutoff wavelength 306 of the second interference filter 208 is around 725 nm.

The first cutoff wavelength 306 of the second interference filter 208 is less than the second cutoff wavelength 304 of the first interference filter 204. Thus, the first cutoff wavelength 306 of the second interference filter 208 is between the first cutoff wavelength 304 of the first interference filter 204 and the second cutoff wavelength 304 of the first interference filter 204. In this regard, the cutoff wavelengths of the first interference filter 204 overlaps with the cutoff wavelengths of the second interference filter 208.

The second interference filter 208 transmits less than 50% of light above the first cutoff wavelength 306. In some embodiments, the second interference filter 208 transmits less than 50% of light above the first cutoff wavelength 306 up to a second cutoff wavelength. Although not depicted, the second interference filter 208 may be a notch filter. The second interference filter 208 may also include a second cutoff wavelength (not depicted). The second cutoff wavelength of the second interference filter 208 may be between 1100 or 1200 nanometers. The second interference filter 208 then blocks light out to about 1100 or 1200 nanometers. In some embodiments, the second interference filter 208 has 5% or less transmission between 750 and 1000 nanometers. In some embodiments, the second interference filter 208 has 2% or less transmission between 750 and 1000 nanometers.

In some embodiments, the second interference filter 208 is shifted over angle or shifted in spectrum to transmit longer wavelengths of light than the first interference filter 204. For example, the first interference filter 204 may reflect and not transmit red light (light with a wavelength of 625 nm to 750 nm). The second interference filter 208 may transmit and not reflect the red light.

The transmission curve characteristics of the first interference filter 204 and the second interference filter 208 are based on the angle of incidence of light on the first interference filter 204 and the second interference filter 208 respectively. The transmission curves of the first interference filter 204 and the second interference filter 208 depicts normal or on-axis light through the first interference filter 204 and the second interference filter 208. Off-axis light that goes through the first interference filter 204 and/or the second interference filter 208 may be downshifted in nanometers as compared to the on-axis light that goes through the first interference filter 204 and/or the second interference filter 208. For example, off-axis light at 45 degrees that goes through the first interference filter 204 may be upshifted 20 to 30 nanometers as compared to the on-axis light that goes through the first interference filter 204. In this regard, the off-axis light passes through the first interference filter 204 at larger angles than the on-axis light.

Figure 4:
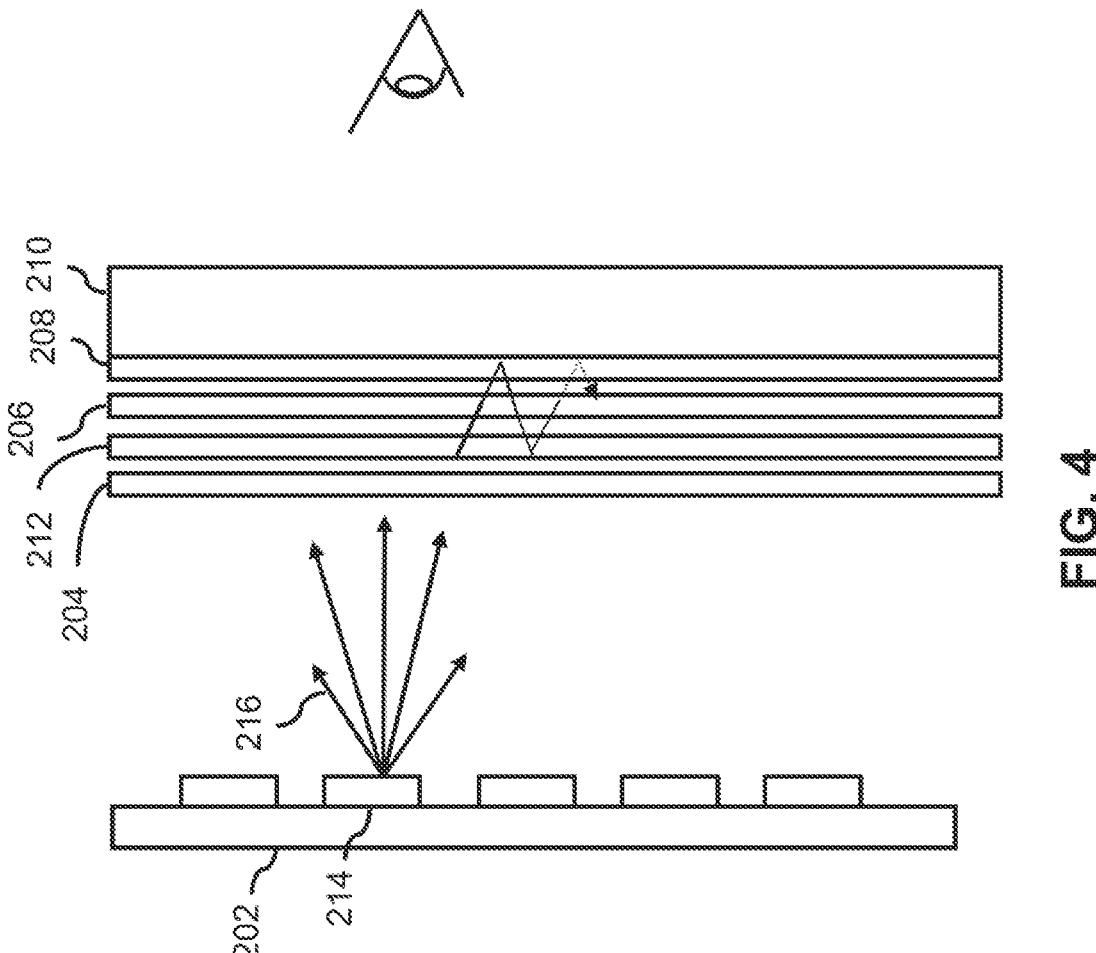
FIG. 4 depicts a side view of a display including a split NVIS filter design and an absorptive filter, in accordance with one or more embodiments of the present disclosure.

Referring now in particular to FIG. 4, the display 200 is further described, in accordance with one or more embodiments of the present disclosure. In embodiments, the display 200 includes an absorptive filter 212.

The absorptive filter 212 has absorption bands in the visible electromagnetic spectrum that are weak and then abruptly transitions to strong absorption bands in the near-infrared electromagnetic spectrum. The display 200 may optionally include the absorptive filter 212 to give extra blocking in the near-infrared electromagnetic spectrum. However, the use of the absorptive filter 212 may increase power consumption of the backlight 202. Therefore, the display 200 may or may not include the absorptive filter 212 depending upon the desired blocking and power consumption characteristics of the display 200.

The absorptive filter 212 is a dye-based absorptive filter. In this regard, the absorptive filter 212 may include one or more absorbing dyes. The one or more absorbing dyes may be hosted by a monomer and/or polymer. In some embodiments, the one or more absorbing dyes include metallic ions. For example, the one or more absorbing dyes may include, but are not limited to, cobalt ions, nickel ions, and the like.

The absorptive filter 212 is disposed in any location in front of the backlight 202. In some embodiments, the absorptive filter 212 is disposed between the backlight 202 and the LCD stack 210. For instance, the absorptive filter 212 may be disposed between the backlight 202 and the diffuser 206 (e.g., between the backlight 202 and the first interference filter 204, between the first interference filter 204 and the diffuser 206 as depicted). By way of another instance, the absorptive filter 212 may be disposed between the diffuser 206 and the LCD stack 210 (e.g., between the diffuser 206 and the second interference filter 208, between the second interference filter 208 and the LCD stack 210). The position of the absorptive filter 212 defines an eminence performance and a power consumption of the display 200. The display 200 may achieve a best eminence performance when the absorptive filter 212 is disposed between the backlight 202 and the diffuser 206. The display 200 may achieve a lowest power consumption when the absorptive filter 212 is between the diffuser 206 and the LCD stack 210. The placement of the absorptive filter 212 may be selected to optimize for the eminence performance and/or the power consumption.

Although the absorptive filter 212 is described as being disposed between the backlight 202 and the LCD stack 210, this is not intended as a limitation of the present disclosure. It is further contemplated that the absorptive filter 212 may be disposed in front of the LCD stack 210 (i.e., between the LCD stack 210 and the eye of the pilot). However, placing the absorptive filter 212 in front of the LCD stack 210 may be disadvantageous to maintain a low reflectance in the LCD stack 210.3

In some embodiments, the absorptive filter 212 is disposed between the first interference filter 204 and the second interference filter 208. Positioning the absorptive filter 212 between the first interference filter 204 and the second interference filter 208 may be desirable. For example, a majority of the light 216 with the infrared and near-infrared wavelengths is reflected by the first interference filter 204 back towards the backlight 202. A portion of the infrared and near-infrared wavelengths of the light 216 passes through the first interference filter 204 to the absorption filter 212. The absorption filter 212 absorbs a portion of the received infrared and near-infrared wavelengths of the light 216 on a first pass. The remaining light passes through the diffuser 206 to the second interference filter 208. A majority of the light 216 received by the second interference filter 208 with the with the infrared and near-infrared wavelengths is then reflected backwards. The light 216 with the infrared and near-infrared wavelengths is then repeatedly reflected in a path between the first interference filter 204, the absorptive filter 212, the diffuser 206, and the second interference filter 208. The repeated reflection in the path between the first interference filter 204, the absorptive filter, the diffuser 206, and the second interference filter 208 the absorptive filter to absorb the light 216 with the infrared and near-infrared wavelengths in multiple passes. In this regard, the first interference filter 204 and the second interference filter 208 may be considered to form an optical cavity. The absorptive filter 212 and the diffuser 206 are in the optical cavity. The light 216 with the infrared and near-infrared wavelengths is reflected in the optical cavity. The light 216 with the infrared and near-infrared wavelengths then repeatedly passes through the absorptive filter 212. The reflected light may bounce around the optical cavity. The return of the reflected light provides a recycling effect of the reflected light at the selected wavelengths. The absorptive filter 212 absorbs light with the infrared and near-infrared wavelengths in the optical cavity. The absorptive filter 212 is advantageous to absorb light in both directions.

In some embodiments, light shifted over angle may undesirably pass through the first interference filter 204. The absorptive filter 212 removes the light 216 that is shifted over angle in the near-infrared wavelengths. Thus, the absorptive filter 212 may be advantageous to remove the off-axis light at the near-infrared wavelengths.

Figure 5:
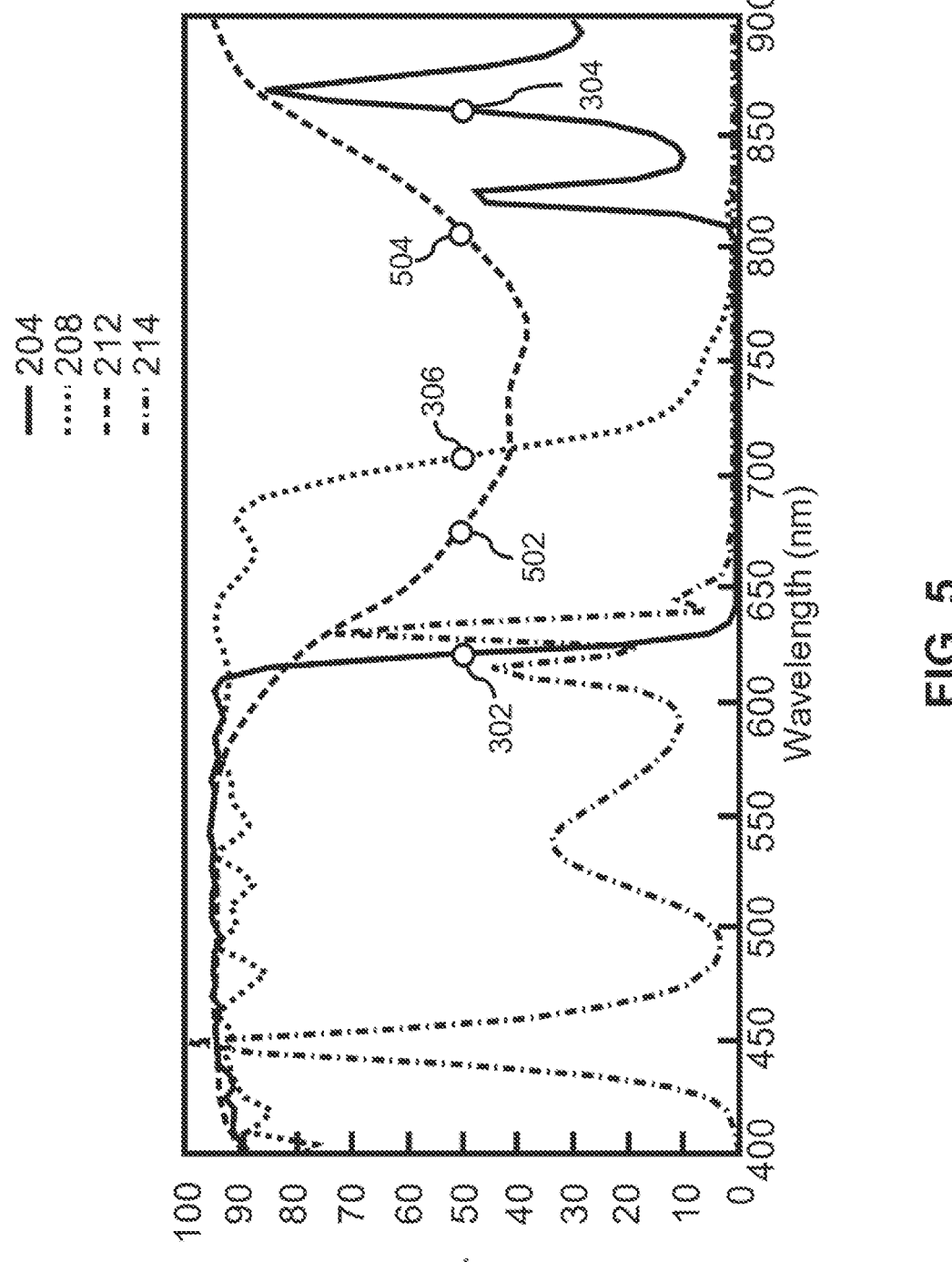
FIG. 5 depicts a graph of transmission curves of split NVIS filters and a normalized LED spectrum, in accordance with one or more embodiments of the present disclosure.

Referring now to FIG. 5, a graph 500 is described, in accordance with one or more embodiments of the present disclosure. The graph 500 depicts transmission curves of the first interference filter 204, the second interference filter 208, and the absorptive filter 212 as a function of wavelength in nanometers. The graph 500 also depicts a normalized spectrum of the one or more LEDs 214 as a function of wavelength in nanometers. The y-axis of the graph 500 is in a scale of 0 to 100 percent.

The discussion of the transmission curves of the first interference filter 204 and the second interference filter 208 with respect to the graph 300 is incorporated herein reference in the entirety with respect to the graph 500.

The absorptive filter 212 is a notch filter. The absorptive filter 212 includes a first cutoff wavelength 502 and a second cutoff wavelength 504. The second cutoff wavelength 504 of the absorptive filter 212 is greater than the first cutoff wavelength 502 of the absorptive filter 212. The absorptive filter 212 transmits less than fifty percent of the light 216 between the first cutoff wavelength 502 and the second cutoff wavelength 504.

In some embodiments, the first cutoff wavelength 502 of the absorptive filter 212 is greater than the first cutoff wavelength 302 of the first interference filter 204 and less than the first cutoff wavelength of the second interference filter 208. In this regard, the first cutoff wavelength 502 of the absorptive filter 212 is between the first cutoff wavelength 302 of the first interference filter 204 and the first cutoff wavelength of the second interference filter 208. For example, the first cutoff wavelength of the absorptive filter 212 may be about 675 nm.

In some embodiments, the second cutoff wavelength 504 of the absorptive filter 212 is greater than the first cutoff wavelength of the second interference filter 208 and less than the second cutoff wavelength of the first interference filter 204. In this regard, the second cutoff wavelength 504 of the absorptive filter 212 is between the first cutoff wavelength of the second interference filter 208 and the second cutoff wavelength of the first interference filter 204. For example, the second cutoff wavelength 504 of the absorptive filter 212 is about 800 nm.

In some embodiments, the one or more LEDs 214 include rare earth white LEDs. The normalized spectrum of the rare earth white LEDs is depicted. The rare earth white LEDs have a spectrum with peaks at about 450 nm, at about 525 nm, and about 640 nm. The rare earth white LEDs also have minimal emission above 650 nm. The rare earth LED includes a sharp cutoff of light after 650 nm.

Referring now to FIG. 6, a table 600 is described, in accordance with one or more embodiments of the present disclosure. The table 600 describes one or more characteristics of the display 200 with the characteristics of the graph 500. u' refers to the 1976 Uniform Chromaticity Scale (UCS) chromaticity coordinate. v' refers to the 1976 UCS chromaticity coordinate transformation. NRa refers to NVIS radiance requirements for Class A equipment. NRb refers to NVIS radiance requirements for Class B equipment.

In embodiments, the display 200 exceeds NVIS Class A and/or Class B requirements set forth in MIL-STD-3009. The display 200 may achieve an improved color space of existing NVIS compatible displays. The improved color spaced enables reducing backlight power while achieving comparable luminance values as legacy displays. The display 200 also meets the requirement for black eminence. Black eminence refers to eminence when the screen is black. The black eminence may be important when flying at night time. Increases in the display size causes the black areas of the display to provide interference with the night vision goggles.

Referring generally again to FIGS. 1-6. The display 200 may also include a controller (not depicted). The controller is configured to drive the backlight 202 and/or the LCD stack 210. The controller may include one or more processors and memory. The one or more processors may be implemented as any suitable processor, such as a general-purpose processor or a field-programmable gate array (FPGA). The one or more processors may be configured to run various software applications or computer code stored (e.g., maintained) in a non-transitory computer-readable medium (e.g., memory) and configured to execute various instructions or operations. The one or more processors may be implemented as a special purpose processor configured (e.g., programmed) to execute instructions for performing any or all of the operations disclosed throughout.

In some embodiments, the LCD stack 210 may not include a good response time when cold. In some embodiments, the display 200 includes one or more heaters (not depicted). The heaters may maintain the LCD stack 210 above a minimum operating temperature. The heaters may be in one or more locations. For example, the LCD stack 210 may include one or more conductive heaters (e.g., The heaters may include a heater (e.g., indium tin oxide (ITO) conductive heaters). By way of another example, the backlight 202 may include one or more resistive heaters, ultra-violet (UV) LEDs, or the like.

In some embodiments, the one or more LEDs 214 may include primary mode LEDs and/or one or more NVIS mode LEDs. The display 200 may be operated in primary mode by activating the primary mode LEDs and deactivating the NVIS mode LEDs. The display may be operated in NVIS mode by activating the NVIS mode LEDs and deactivating the primary mode LEDs. A luminance of the display 200 is lowered by switching from the primary mode to the NVIS mode. Notably, the display 200 may produce red color displays when operating in the primary mode and in the NVIS mode.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A display comprising:
a backlight comprising one or more light emitting diodes (LEDs) configured to generate light;
a first interference filter; wherein the first interference filter comprises a first cutoff wavelength and a second cutoff wavelength; wherein the second cutoff wavelength of the first interference filter is greater than the first cutoff wavelength of the first interference filter;
a diffuser; wherein the first interference filter is between the backlight and the diffuser;
a second interference filter; wherein the diffuser is between the first interference filter and the second interference filter; wherein the second interference filter comprises a first cutoff wavelength; wherein the first cutoff wavelength of the second interference filter is between the first cutoff wavelength of the first interference filter and the second cutoff wavelength of the first interference filter; and
an LCD stack; wherein the second interference filter is between the diffuser and the LCD stack.

2. The display of claim 1, wherein the first interference filter is a notch filter; wherein the second interference filter is a longer wavelength blocking filter.

3. The display of claim 1, wherein the first interference filter transmits less than fifty percent of the light between the first cutoff wavelength of the first interference filter and the second cutoff wavelength of the first interference filter.

4. The display of claim 1, wherein the second interference filter transmits less than fifty percent of the light above the first cutoff wavelength of the second interference filter.

5. The display of claim 1, wherein the one or more LEDs comprise a rare earth LED.

6. The display of claim 1, comprising an absorptive filter; the absorptive filter comprising a first cutoff wavelength and a second cutoff wavelength; wherein the second cutoff wavelength of the absorptive filter is greater than the first cutoff wavelength of the absorptive filter.

7. The display of claim 6, wherein the absorptive filter is a dye-based absorptive filter.

8. The display of claim 6, wherein the absorptive filter transmits less than fifty percent of the light between the first cutoff wavelength of the absorptive filter and the second cutoff wavelength of the absorptive filter.

9. The display of claim 6, wherein the first cutoff wavelength of the absorptive filter is between the first cutoff wavelength of the first interference filter and the first cutoff wavelength of the second interference filter.

10. The display of claim 6, wherein the second cutoff wavelength of the absorptive filter is between the first cutoff wavelength of the second interference filter and the second cutoff wavelength of the first interference filter.

11. The display of claim 6, wherein the absorptive filter is disposed between the backlight and the LCD stack.

12. The display of claim 11, wherein the absorptive filter is disposed between the first interference filter and the second interference filter.

13. The display of claim 12, wherein the absorptive filter is disposed between the first interference filter and the diffuser.

14. The display of claim 1, wherein the display exceeds Class B requirements set forth in MIL-STD-3009.

15. A cockpit comprising:
one or more flight displays comprising:
a backlight comprising one or more light emitting diodes (LEDs) configured to generate light;
a first interference filter; wherein the first interference filter comprises a first cutoff wavelength and a second cutoff wavelength; wherein the second cutoff wavelength of the first interference filter is greater than the first cutoff wavelength of the first interference filter;
a diffuser; wherein the first interference filter is between the backlight and the diffuser;
a second interference filter; wherein the diffuser is between the first interference filter and the second interference filter; wherein the second interference filter comprises a first cutoff wavelength; wherein the first cutoff wavelength of the second interference filter is between the first cutoff wavelength of the first interference filter and the second cutoff wavelength of the first interference filter; and
an LCD stack; wherein the second interference filter is between the diffuser and the LCD stack.

* * * * *